United States Patent
Velasco (10) Patent No.: US 11,097,640 B2
(45) Date of Patent: Aug. 24, 2021

(54) METHOD AND ARTICLES FOR ATTACHING UPHOLSTERY COVERS AND OTHER FLEXIBLE MATERIAL

(71) Applicant: Howard Velasco, Bristol, CT (US)

(72) Inventor: Howard Velasco, Bristol, CT (US)

(73) Assignee: FRANKLIN PRODUCTS, INC., Torrington, CT (US)

( * ) Notice: Subject to any disclaimer, the term of this patent is extended or adjusted under 35 U.S.C. 154(b) by 770 days.

(21) Appl. No.: 14/677,494

(22) Filed: Apr. 2, 2015

(65) Prior Publication Data

US 2015/0283929 A1 Oct. 8, 2015

Related U.S. Application Data

(60) Provisional application No. 61/974,693, filed on Apr. 3, 2014.

(51) Int. Cl.
| | |
|---|---|
| *B60N 2/58* | (2006.01) |
| *B21F 3/00* | (2006.01) |
| *B60N 2/60* | (2006.01) |
| *B29C 70/54* | (2006.01) |
| *B64D 11/06* | (2006.01) |
| *B29L 31/30* | (2006.01) |

(52) U.S. Cl.
CPC .............. *B60N 2/5841* (2013.01); *B21F 3/00* (2013.01); *B29C 70/543* (2013.01); *B60N 2/5825* (2013.01); *B60N 2/5858* (2013.01); *B60N 2/6027* (2013.01); *B60N 2/6063* (2013.01); *B64D 11/0647* (2014.12); *B29L 2031/3076* (2013.01); *Y02T 50/40* (2013.01); *Y10T 24/44573* (2015.01); *Y10T 29/481* (2015.01)

(58) Field of Classification Search
CPC .. B60N 2/5841; B60N 2/5825; B60N 2/6022; B60N 2/6063; B64D 11/0647; B21F 3/00; B29C 70/543
USPC ............................................ 297/218.4, 218.5
See application file for complete search history.

(56) References Cited

U.S. PATENT DOCUMENTS

| | | | | |
|---|---|---|---|---|
| 1,515,711 | A | * 11/1924 | Van Hove | B60N 2/7041 |
| | | | | 297/218.5 |
| 1,962,215 | A | * 6/1934 | Sallop | B60N 2/5816 |
| | | | | 297/226 |
| 2,266,466 | A | * 12/1941 | Kordel | A47C 7/22 |
| | | | | 297/218.5 |

(Continued)

FOREIGN PATENT DOCUMENTS

GB 245842 A * 1/1926 ............... G09F 3/16

OTHER PUBLICATIONS

International Search Report for PCT/US2015/032358 dated Oct. 22, 2015.

(Continued)

*Primary Examiner* — Anthony D Barfield
(74) *Attorney, Agent, or Firm* — McCormick, Paulding & Huber PLLC (57) ABSTRACT

An article of upholstery covering is attached to an article of furniture, by steps that include inserting, into a channel around a frame of the article of furniture, an edge attachment article that is attached by an securement portion thereof along a periphery of the article of upholstery covering; and tensioning the article of upholstery covering to engage a catch portion of the edge attachment article under a lip of the channel.

17 Claims, 13 Drawing Sheets

(56) References Cited

U.S. PATENT DOCUMENTS

| | | | |
|---|---|---|---|
| 2,876,826 A | | 3/1959 | Neely et al. |
| 2,938,249 A | * | 5/1960 | Milne ................... B60J 10/30 24/296 |
| 4,764,412 A | | 8/1988 | Burns et al. |
| 4,872,724 A | * | 10/1989 | Deley ................ A47C 31/023 297/218.4 X |
| 5,023,125 A | | 6/1991 | Gray |
| 5,768,758 A | * | 6/1998 | Deignan ............... A47C 31/02 297/218.4 |
| 5,931,538 A | | 8/1999 | Cayet et al. |

OTHER PUBLICATIONS

Partial Supplementary European Search Report for European Patent Application No. 15772192.9-1754 dated Dec. 14, 2017.

\* cited by examiner

METHOD AND ARTICLES FOR ATTACHING UPHOLSTERY COVERS AND OTHER FLEXIBLE MATERIAL

CROSS REFERENCE TO RELATED APPLICATION

This is a non-provisional application, which claims priority under 35 USC § 119(e) from U.S. Pat. App. 61/974,693 "Method of Attaching Upholstery Covers and Other Flexible Material" and from U.S. Pat. App. 61/974,704 "Lightweight Dress Cover with Edge Attachment" both filed 3 Apr. 2014 and hereby incorporated by reference in their entireties.

BACKGROUND

1. Technical Field

The invention relates to attachments of flexible articles to supporting frames. Exemplary embodiments of the invention relate to methods and articles for attaching upholstery coverings to furniture frames.

2. Discussion of Art

Commercial aircraft seating is evolving to satisfy demands for greater comfort and cleaner styling within a smaller, lighter package. At the same time there is a need to reduce manufacturing and maintenance costs. The aircraft seating upholstery has a large influence on comfort, styling, weight and cost.

Upholstery for aircraft seating usually includes a dress cover that is used to provide the final layer of comfort control, feel and appearance. The covers are made from many materials, commonly cloth fabrics, natural, reconstituted, and faux leather are used. Some include foam or other types of padding. The covers must be removable for maintenance, especially fabric ones which require dry cleaning. Dress cover design and construction varies widely depending on the seat configuration, material, design aesthetics, and acceptable cost. However, it is common for covers to be complicated to make and install. Much of the complexity stems from needing to be removable.

Typically it is desirable that the upholstery covers be removable for cleaning and other seat maintenance. Most often, aircraft seat manufacturers have resorted to hook and loop fasteners as a method to attach upholstery to the seat structure. Other methods such as plastic "J" strips and arrow strips have also been used. While these methods are considered to function satisfactorily, they often contribute to complicated cover designs and higher manufacturing costs, It is common that the installation or removal of a typical dress cover is a complicated and time consuming process requiring workers skilled in fitting up the upholstery. This leads to undesirable costs.

SUMMARY OF INVENTION

The described invention provides a novel method of attaching an upholstery cover, making possible simplified covers that can be quickly installed and removed without tools or the usual painstaking effort needed to achieve a tight high-level fit and finish. This rapid installation and removal means shorter assembly times for seat builders and lower maintenance costs for airlines. A simplified cover is less expensive to make and an easy to achieve crisp fit and finish means new styling possibilities for designers looking to showcase cleaner lines. The attachment is particularly suited for laminated pad type covers.

While the invention is described attaching upholstery covers to aircraft seats the same advantages would be provided for automotive or mass transit seating, office or residential seating, or for securing fabric and other woven and flexible materials to frames for other purposes. For example, embodiments of the invention could be used to attach suspension diaphragms to seat frames. Equally, other embodiments of the invention could be used fasten other flexible materials to frames for applications such as awnings. The described invention could be used to secure covers for trailers, boats or truck beds. Versions with flexible channels could be useful as closures for backpacks, luggage, or clothing.

The invention provides an attachment article that can be fastened to a first flexible article, and that mates with a channel attached to a the structural members of the seat, particularly the back frame and bottom frame. The cover is of simple design with a straight forward interface with the seat, is easier to make and speeds installation and removal. Simplifying the design is a way to reduce cost and weight. This is especially important with aircraft seats. The ease of removal and installation can provide benefits in many transportation and furniture applications.

A dress cover is claimed that differs from conventional covers by having attachment generally along its perimeter edge. The pad is shaped and sized so that its perimeter more or less matches the shape of the seat frame. Approximating the shape of the frame greatly simplifies the design and sewing construction. This approach is very suited to covers made from laminated pads. A dress cover with edge attachment made using a laminated pad is described. The described dress cover is can be used on many types of seats but is particularly suited for use on seats having a frame and seating diaphragm.

"Spring material" in context refers to any sort of material formed in an edge attachment article as described above, with cross-section suitable for elastic deformation without fracture during insertion and removal into and from a furnishing groove according to methods as described above. "Washable spring material" refers to spring material that is suitable for repeated commercial laundering without fracture or corrosion. Exemplary spring materials include spring tempered stainless steel, nylon or ABS monofilament The varied exemplary embodiments of the invention, as briefly described above, are illustrated by certain of the following figures.

DETAILED DESCRIPTION

Although embodiments of the invention are shown in the drawings and are described as relating to upholstery covers for aircraft seating, aspects of the invention more generally may be applicable to, e.g., tarpaulin covers for boats, tables, or the like.

Figure 1:
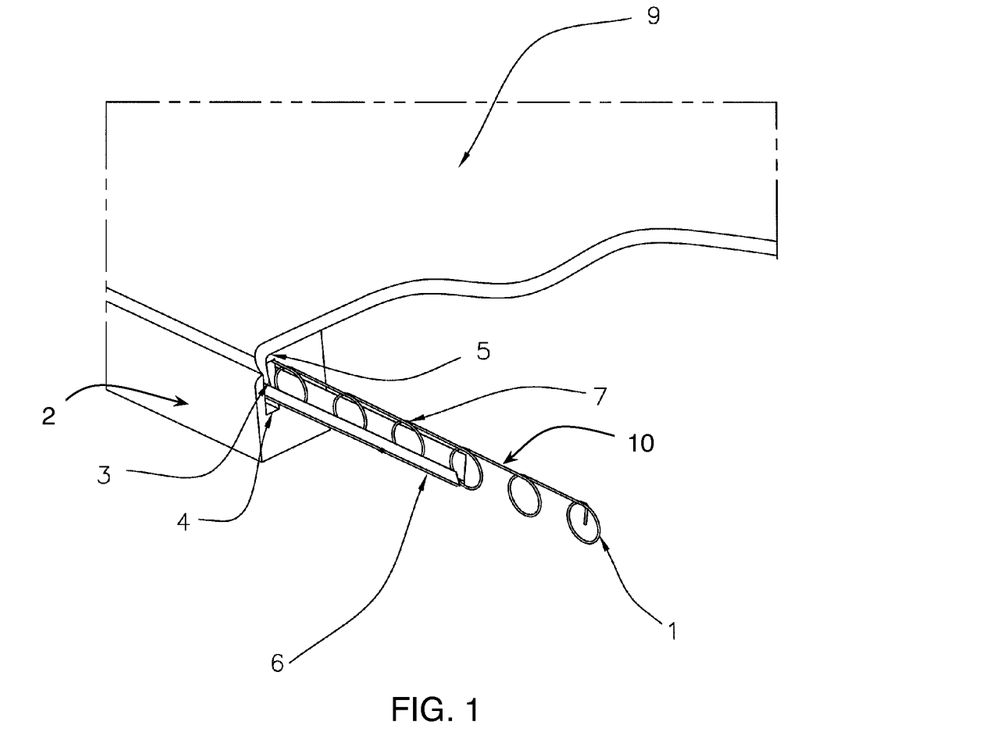
FIG. 1 shows in perspective view an upholstery cover that is attached to an upholstery frame by an edge attachment article according to an embodiment of the invention.
Figure 2:
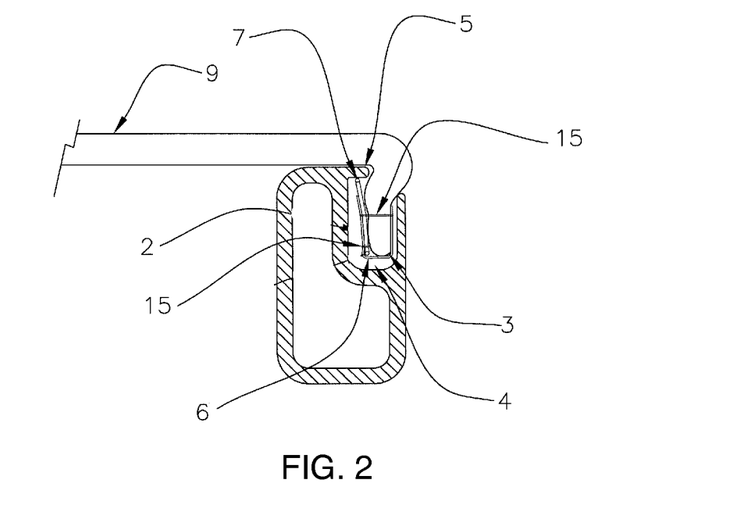
FIG. 2 shows in sectional view the upholstery cover, frame, and edge attachment article of FIG. 1.

FIG. 1 shows in perspective view an upholstery cover 9 that is attached to an upholstery frame 2 by an edge attachment article 1 according to an embodiment of the invention. FIG. 2 shows in sectional view the same upholstery cover, frame, and edge attachment article of FIG. 1. The exemplary edge attachment article 1 consists of a wire that is formed into a continuous series of loops 7, which are joined by linking portions 10. The edge attachment article 1 is secured (e.g., by stitching 15 or by gluing of the looped "securement portion" 7) into a folded support tape 6, for example a strip of nylon fabric, which is assembled (e.g., by stitching 15 or by gluing) to the fabric dress cover 9 in order to form an edge 3. The assembled edge 3 is inserted into a channel or furnishing groove 4 that is mounted on or formed in the frame 2. The channel 4 has an overhanging lip 5.

Referring to the section view of FIG. 2, when the assembled edge 3 is inserted into the channel 4, and tension is applied to the dress cover 9, as when an occupant is seated, the fabric edge 3, the tape 6, and the wire loops 7 are pulled to the channel wall that is opposite the lip 5. This creates a twisting and wedging action that causes the linked portion 10 of the wire 1 to catch under the lip 5 as a "catch portion" that prevents the assembled edge 3 escaping the channel 4. Thus, when the attachment article 1 is in its installed position, each of the linking straight portions 10 is positioned crossing from the open side of the channel 4 on the exposed side of one loop 7 to the side of the next loop 7 that is under the overhanging lip 5. To release or disengage the attachment article 1 from out of the channel 4, the linked portion 10 of a loop 7 can be pulled or twisted sideways from under the lip 5 and slipped out of the channel 4. This puts the edge attachment article 1 into a condition where the next linked portion 10 extends from the open side wall of the channel 4 on the removed loop, to the side of the next loop that remains under the lip 5. As the next linked portion 10 slides along the underside of the channel lip 5, it draws the next loop 7 to the edge of the channel lip. This action causes each loop 7 to release each subsequent loop as the edge 3 is withdrawn from the channel 4, in a gradual or zipper-like fashion. The loop and straight section arrangement ensures proper and continuous disengagement of the edge 3 under substantially constant pulling load, which enhances reliable release of the cover 9.

Figure 4:
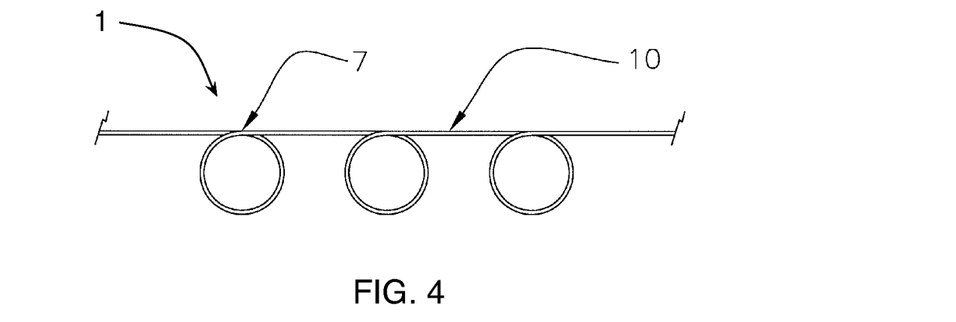
FIG. 4 shows in detail the edge attachment article of FIG. 1.
Figure 5:
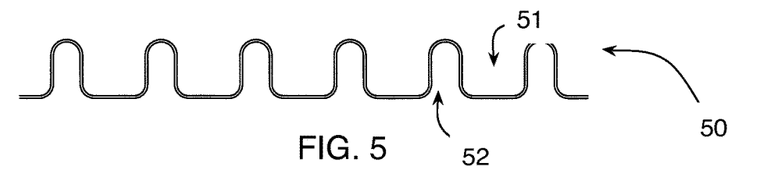
FIGS. 5-16 show in plan view other edge attachment articles according to other embodiments of the invention.
Figure 6:
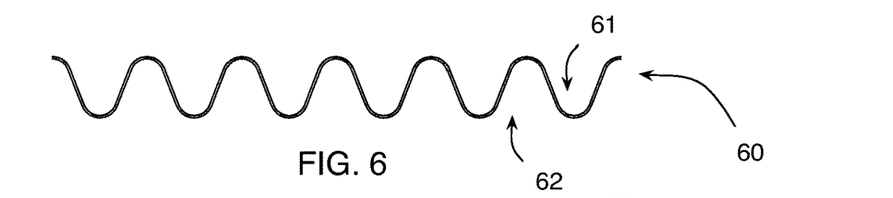
Figure 7:
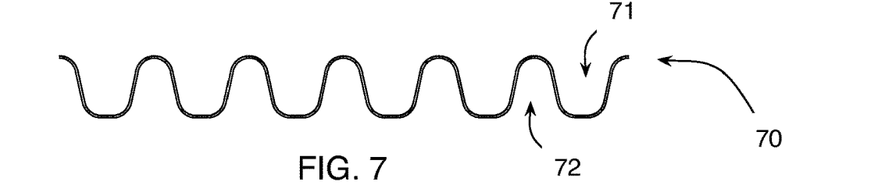

The wire edge attachment article 1 is shown in detail in FIG. 4. FIGS. 5-16 show in plan view other edge attachment articles 50, 60, 70, 80, 90, 100, 110, 120, 130, 140, 150, 160 according to other embodiments of the invention. The various edge attachment articles have shapes designed to be compatible with the spacing of standard sewing machine stitches. For example, the article 50 (FIG. 5) is suited for loads of high tension. The straight sectioned securement portions 51, which are disposed between each arched shape of the catch portion 52, distribute the holding load over a longer length of support tape. The simple wavy-shaped articles 60, 70, 80 (FIGS. 6-8) are designed for ease of manufacturing and have their respective securement portions and catch portions numbered similarly to those of the article 50. The wire shapes 50-80 are designed to accommodate bending in more than one direction. The securement portions 61, 71, 81 that are for attachment to the support tape 6 are of differing widths according to relative strength of the wire 1, the tape 6, and/or the fabric cover 9. The wire is typically made of spring tempered stainless steel and is of a small diameter. Typical wire diameters for dress covers would be 0.015"-0.030". Heavier wire can be used in applications having higher loads.

Figures 8, 9:
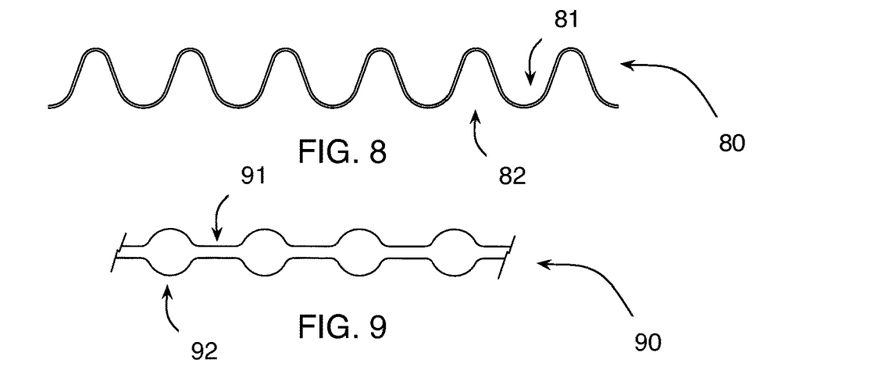
Figure 10:
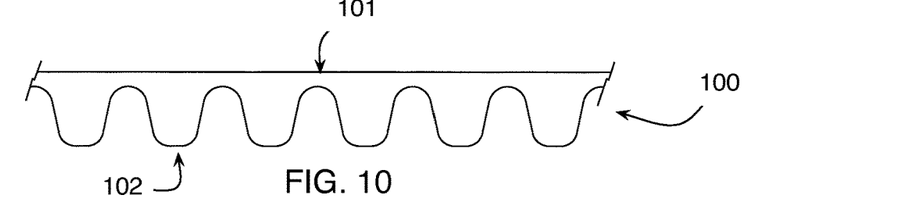
Figure 11:
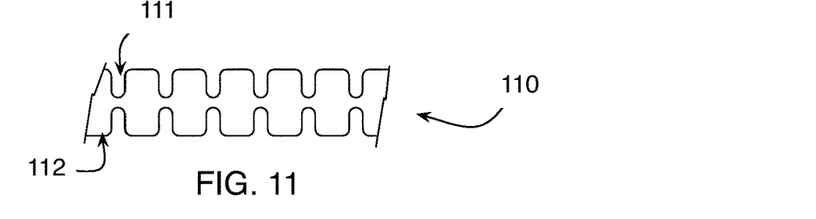

Materials other than stainless steel may be used to make the engaging member. Plastic monofilament can be thermoformed into the needed shape. Some of the shapes can be made of stamped plastic or by continuous injection molding. FIGS. 9-11 show exemplary edge attachment articles 90, 100, 110 made of stamped plastic. Articles of monofilament can be thermoformed into the same shapes as shown in FIGS. 5-8 or as shown in FIGS. 12-16.

Figure 12:
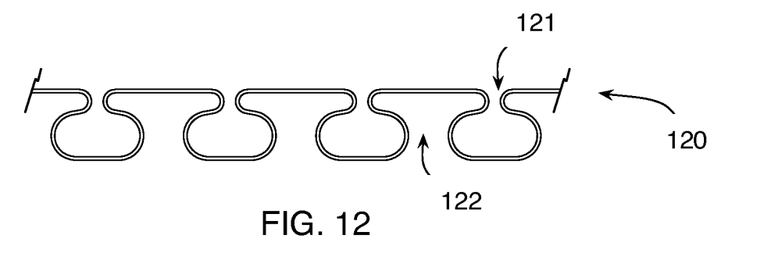
Figure 13:
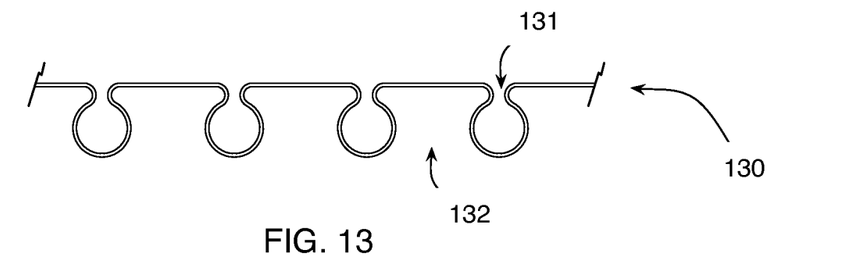

FIGS. 12-13 show two open loop or "omega" shaped edge attachment articles 120, 130. Compared to the closed (wound) loops of the edge attachment article 1, the open loop shapes are lighter weight for a given wire size and are the fastest and least expensive to make. They can also be used when heavier wire is needed. However, the release does not function as with the primary loop design. These can be used where fast, flexible installation is desired and removal is unimportant or secondary to cost.

Figure 14:
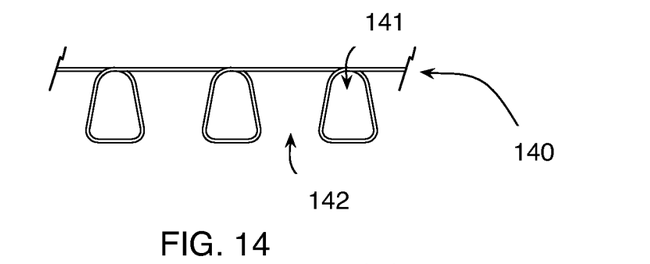
Figure 15:
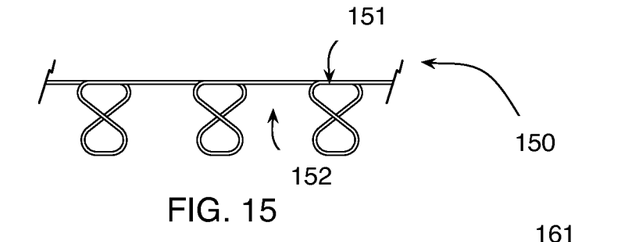
Figure 16:
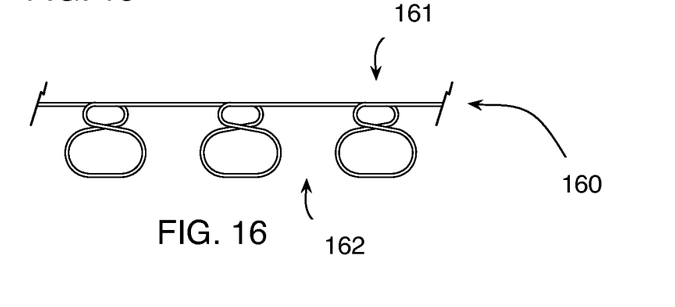

FIGS. 14-16 show three closed (twisted) loop shaped edge attachment articles 140, 150, 160. Like the edge attachment article 1, these edge attachment articles have overlapping portions, therefore, they have similar zipper-like release characteristics. They do not release as cleanly because there is not a continuous loop. Advantageously, the twisted loop designs can be made on conventional forming equipment. But compared with the edge attachment article 1, the twisted designs are heavier. The FIG. 8 twisted design with the larger lower loop can be supported by more flexible bias tapes. The smaller FIG. 8 design is stiffer and can hold greater loads.

The tape 6 can be of fabric or other thin materials such as plastic films. A typical tape for dress covers is made form 400×400 denier nylon pack cloth. Narrow loom woven bias tapes are suitable as well. In the case of plastic films of nylon or polyester the fold can be formed into the tape during manufacture. Methods other than sewing can be used to attach the wire to the tape. The wire can be secured within the fold of a tape made of fusible fabric or plastic film. When fusing the fold closed, a sewing tab or strip can be left to be used when assembling to the dress cover.

Figure 17:
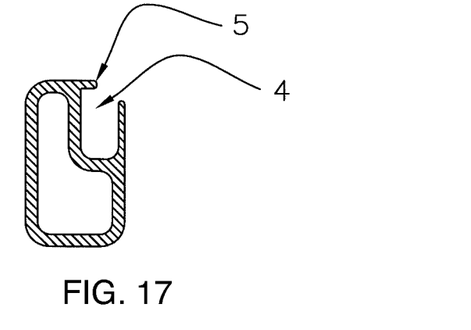
FIGS. 17-23 show in sectional view other upholstery frames and channels according to other embodiments of the invention.
Figure 18:
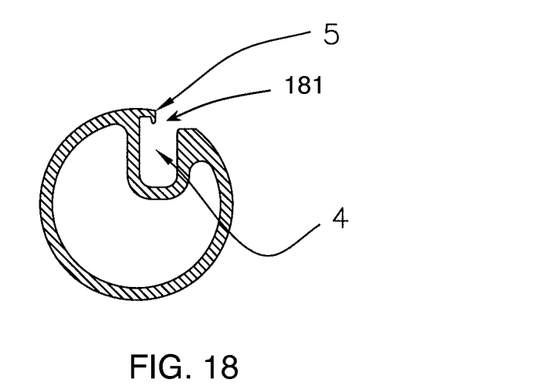
Figure 19:
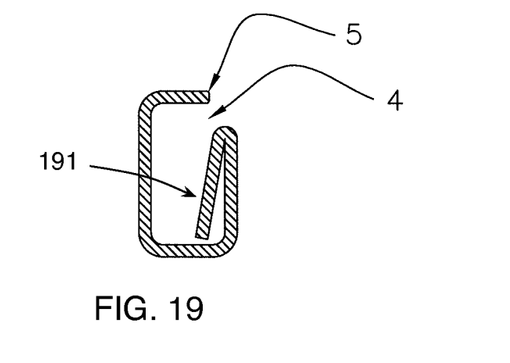

The invention also relates to the channel 4, into which the edge attachment article 1 is inserted on the edge 3 of the dress cover 9. The channel 4 may be integrally formed in the frame 2, as shown in FIGS. 17-19, or it may be attached as a specialized secondary channel 8, as shown in FIGS. 20-23. Referring specifically to FIGS. 18 and 21, the channel 4 or 8 may include an inward hook 181 on the lip 5, thereby enhancing engagement of the edge attachment article 1 under the lip 5. Referring specifically to FIGS. 19 and 22, the channel 4 or 8 may have a slanted outer wall 191 to ease insertion into the channel 4 of the edge 3 bearing the attachment article 1.

Figure 23:
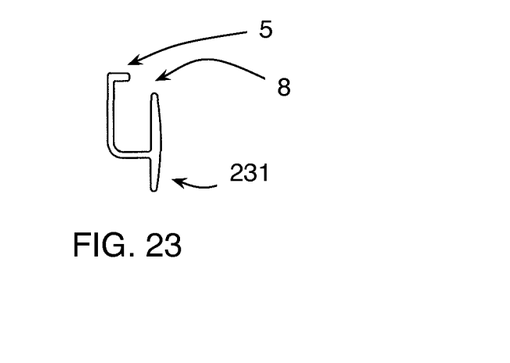

In case a secondary channel 8 is used, the secondary channel is bonded, riveted, or otherwise fastened along the frame 2 where it is to receive the edge attachment article 1 on the dress cover 9. For example, as shown in FIG. 23, the secondary channel 8 may include a flange or rib 231 for a larger fastening area.

Figure 3:
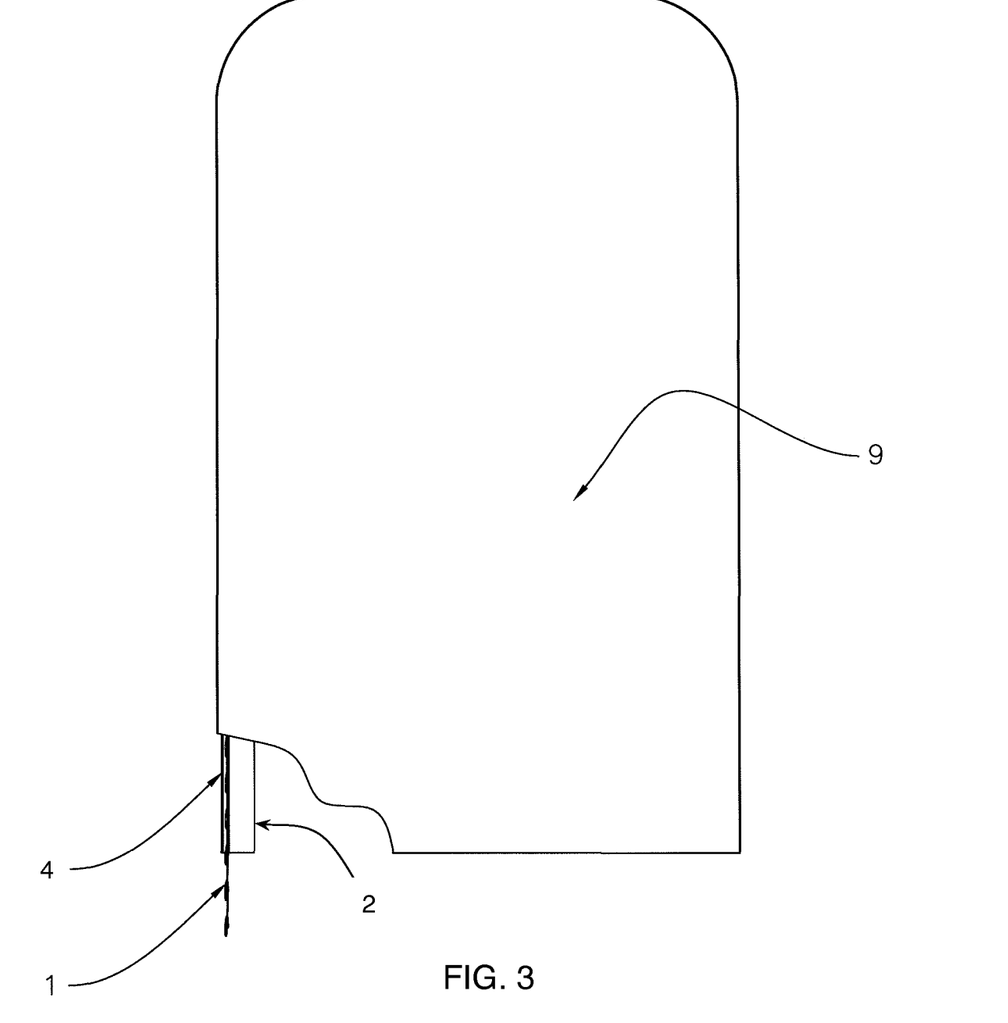
FIG. 3 shows in plan view the upholstery cover, frame, and edge attachment article of FIGS. 1-3.

The frame 2 can be made of extruded aluminum or other lightweight metal, or of fiber reinforced composite. An exemplary frame is shown in FIGS. 1-3. Other exemplary frames are shown sectionally in FIGS. 12-22. A tubular metal frame can be form rolled to create the recess or channel 4, or to form a ledge for attachment of the secondary channel 8. In the case of metal frames brazing can be used to attach metal channels. The other features and properties of the frame are designed to suit requirements of the intended seat configuration and constructed using known methods.

Referring to FIGS. 24-32, a winder 240 is now described for producing a continuous wire form of an edge attachment article 1, as shown in FIGS. 1-4. The continuous wire form may comprise, for example, a 0.026" diameter spring tempered wire, coiled into 0.500" diameter, 360 degree loops, joined by short straight segments into a repeating series of alternating loops and straights. The wire form is generally planar with the loops located 1.000" on center.

Figure 24A:
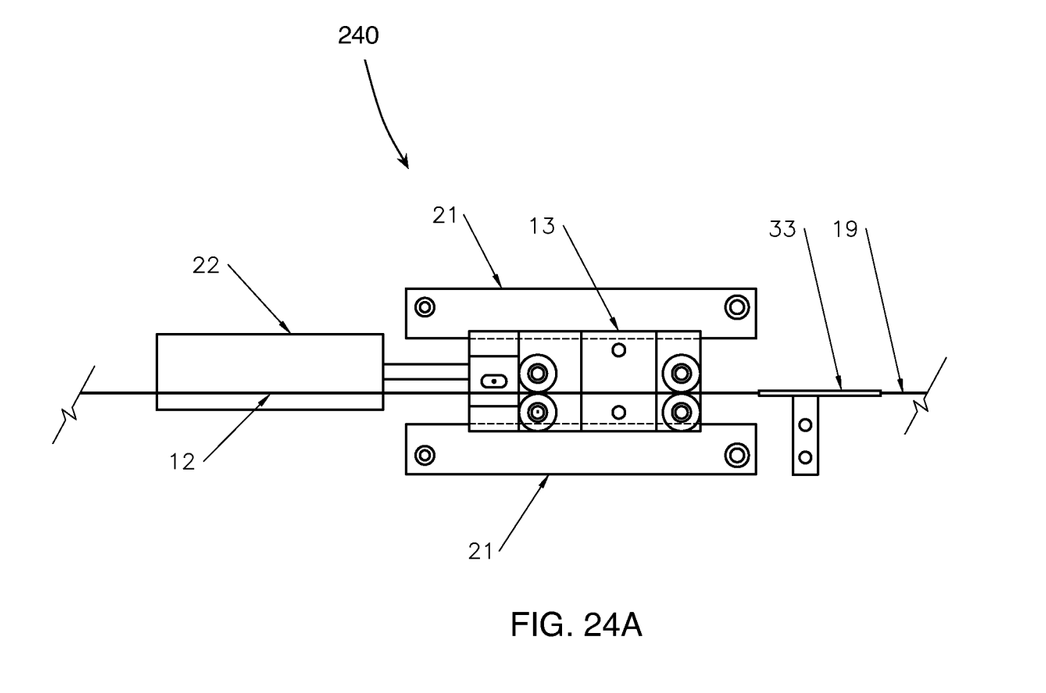
FIGS. 24A-24B show in plan view an apparatus for forming the edge attachment article of FIG. 1.
Figure 24B:
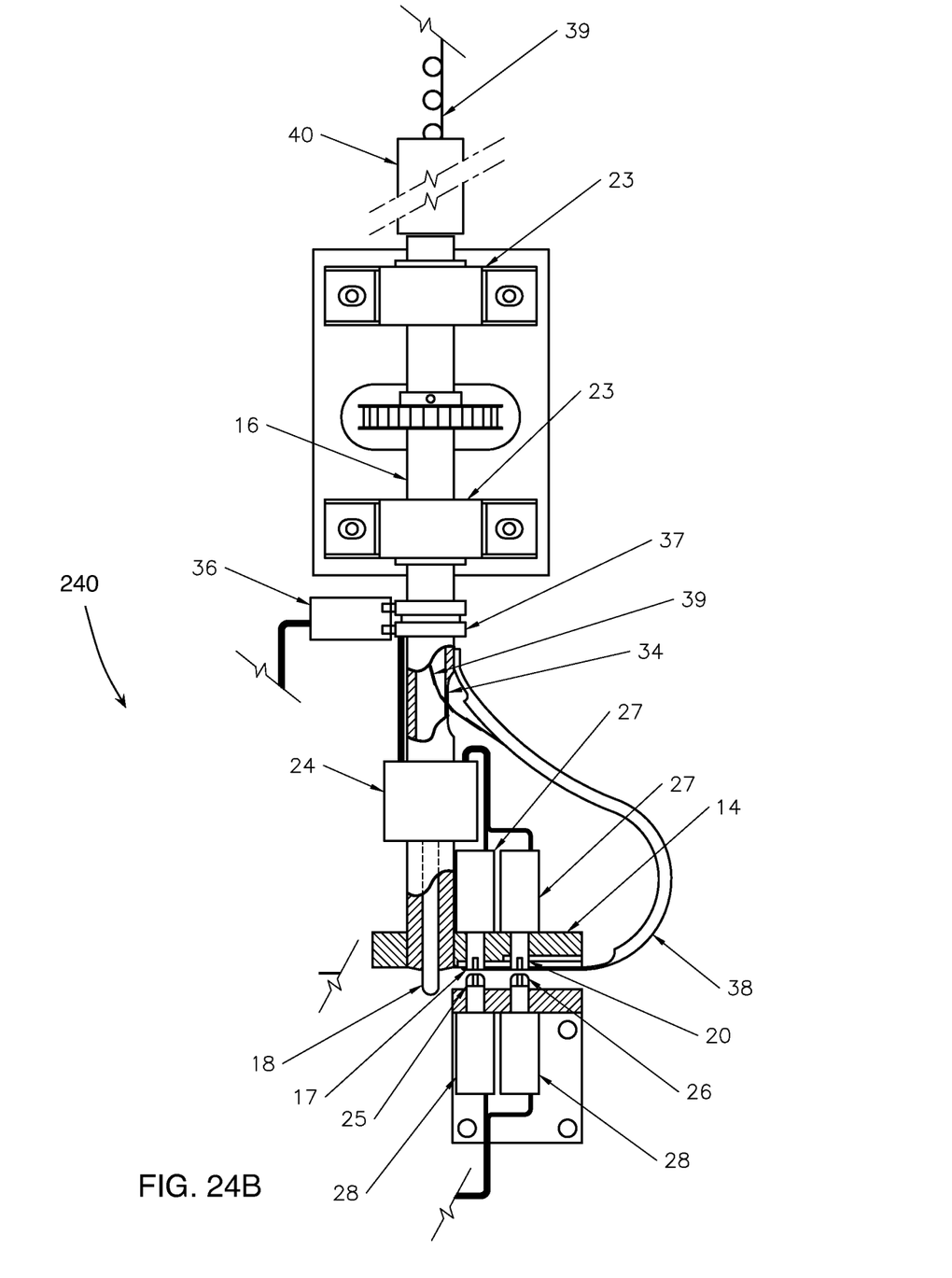
Figure 25:
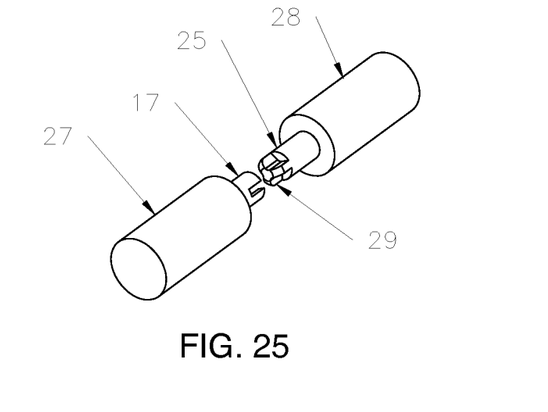
FIGS. 25-26 show in perspective views holding posts and locators of the apparatus of FIG. 24.
Figure 26:
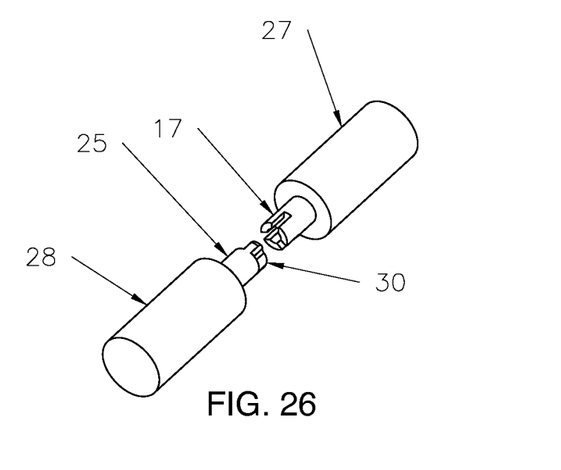
Figure 27:
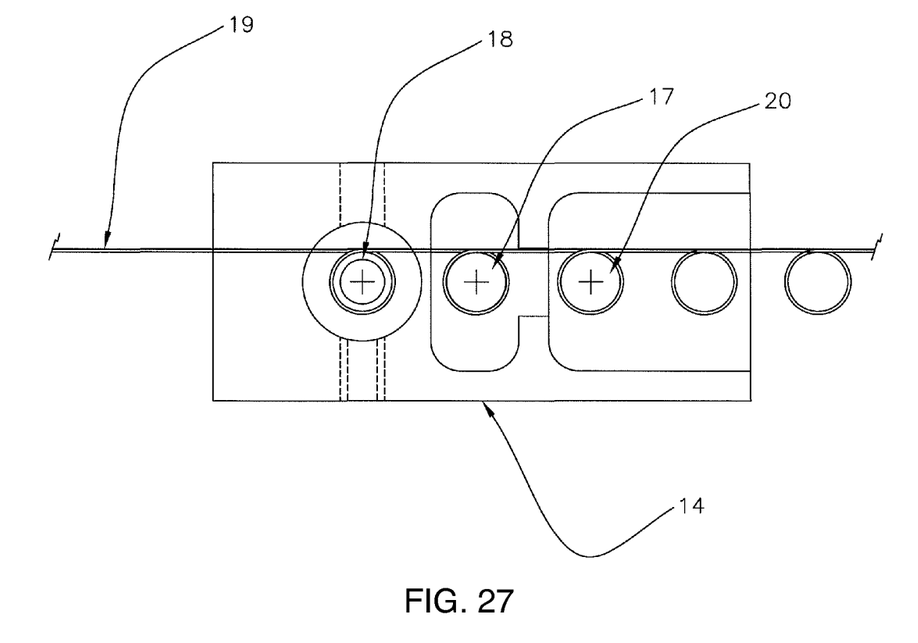
FIG. 27 shows in plan view a mandrel and holding posts of the apparatus of FIG. 24.

The winder 240 includes mechanisms that act to prepare and form the wire and then transport the shaped wire to a coiler (not shown). Alternately the wire form can be fed to additional stations for sewing or fusing it to a tape before coiling the assembled material. The operation of the machine is controlled by a programmable logic controller (PLC) or microprocessor. The main drive is powered by a stepper motor transmitting power with a timing belt and sprockets. The machine performs a combination of synchronous and discreet operations to produce the desired form.

Wire 12 is de reeled from a bulk spool (not shown) and is led first into a multi plane wheel straightening device of conventional design (not shown) and then through a tensioner 13. To form the loops 7, the tensioned wire 19 is wound around a mandrel 18. This winding pulls the wire 19 thru the tensioner 13 which pinches the wire between two pads that are pressed together by adjustable spring compression. The tensioner 13 is movable; reciprocating on slides 21. The reciprocating action is powered by a pneumatic cylinder 22. Solenoid valves activate the cylinder in two directions to move the tensioner 13 back and forth between adjustable stops that set the distance of travel.

After passing through the tensioner 13 the wire 19 proceeds thru a guide tube 33 to a winding head 14 mounted on a hollow shaft 16 that rotates in bearing blocks 23. Mounted on the winding head 14 are the cylindrical mandrel 18, which is centered axially within the hollow shaft 16, and two holding posts 17 and 20 that are spaced apart radially from the mandrel 18, and from each other, at distances equal to the spacing of the loops that will be wound. While a loop is being wound, the holding posts 17 and 20 constrain the wire by engaging the two previously wound loops.

The two holding posts 17 and 20 are retractable into the face of the winding head 14 so as not to interfere with the wire 19 as it is wound onto the mandrel 18. This arrangement allows the winding head 14 to rotate more than a full revolution, as is required to make a complete loop, without being obstructed by the incoming wire 19.

The mandrel 18 also is retractable into the face of the winding head 14. When the mandrel and the two holding posts 17 and 20 have been retracted, the wire 19 can be advanced for winding subsequent loops.

The mandrel 18 is retracted by a solenoid coil 24 positioned around the shaft 16 and to the rear of the winding head 14. The mandrel 18 is extended by a coil spring positioned inside the shaft 16 directly behind the mandrel 18. The holding posts 17 and 20 are retracted by solenoids 27 mounted on the rear of the winding head 14 and are extended by the solenoid return springs. Their normal operating position is extended.

The posts 17 and 20 operate in concert with retractable locators 25 and 26 that when extended, catch and support the loops as the holding posts 17 and 20 are extended to engage the loops. The locators 25 and 26 are in a stationary mount (that is mounted to a same frame as the tensioner 13, and does not rotate with the winding head 14) and are extended by solenoids 28 and retracted by the solenoid return springs. Their normal operating position is retracted.

Figure 20:
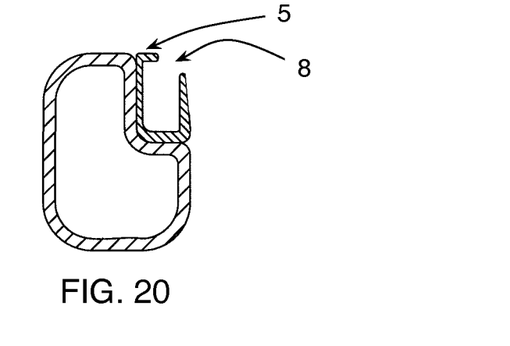
Figure 21:
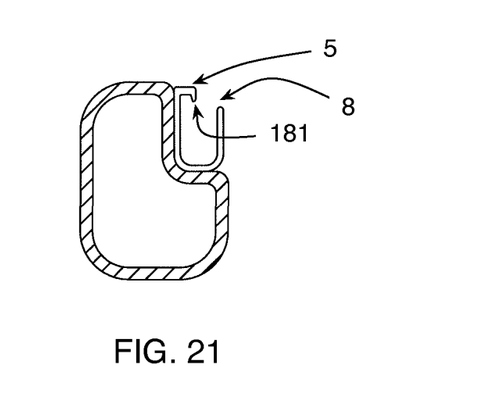
Figure 22:
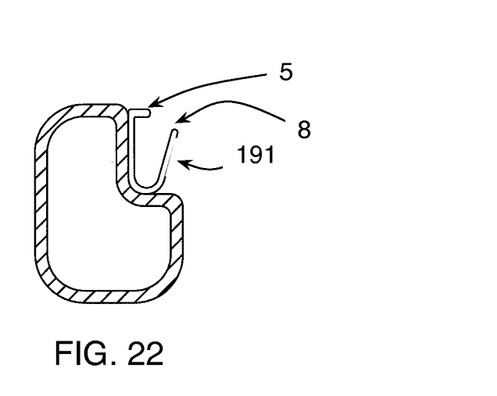

Referring to FIGS. 20 and 21, the portions of the locators 25 and 26 that support the wire loops have a tri finned shape. The fins 29 have rounded ends 30 that act to lead the wire loop onto the locator 25 and 26. With the wire loop supported by the locator 25 and 26, holding posts 17 and 20 are extended and the fins 29 mesh with slots in the end of the holding posts 17 and 20. This meshing ensures smooth transfer of the wire from the locators 25 and 26 to the holding posts 17 and 20. The locators 25 and 26 are then retracted leaving the wire loops held by the holding posts 17 and 20.

A thin plate 31 that is mounted on the winding head 14 covers the formed loops in the area of the holding posts 17 and 20. The plate 31 has two holes that the locators 25 and 26 pass thru when extended and into which the holding posts 17 and 20 seat when the locators 25 and 26 retract before a loop is wound.

The transfer of the loop 32, from mandrel 18 to the first holding post 17 and from first holding post 17 to the second holding post 20, results from the tensioner 13 moving toward the mandrel 18 and extending the clamped wire 19 as to shift the loop 32 from a position in front of the mandrel 18 to in front of the first holding post 17. Between the tensioner 13 and the winding head 14 the wire 19 passes thru a guide tube 33. This keeps the wire 19 from bending or deflecting to the side and ensures that all movement of the tensioning device 13 translates into moving the loop 32 to the next position.

A loop 32 is formed when the winding head 14 rotates, wrapping the tensioned wire 19 around a mandrel 18 of the exact size diameter required to result in a loop of correct size when the wrapped wire is unwound a certain amount from the mandrel 18. To compensate for the spring temper of the wire, the winding head 14 must rotate 420 degrees to form a 360 degree loop. As the wire 19 is wrapped around the mandrel 18, additional wire 12 is drawn through the tensioner 13. After the winding head 14 rotates and winds the loop 32 onto the mandrel 18, it reverses rotation thru 60 degrees, unwrapping the wire 19 just enough to form a completed loop that is loose on the mandrel 18.

After a loop 32 is completed, the mandrel 18 and holding posts 17 and 20 are retracted. The tensioner 13 is moved toward the mandrel 18 without releasing its grip on the wire 19. It travels sufficiently to move the loop 32 from in front of the mandrel 18 into alignment with the first holding post 17.

Figure 28:
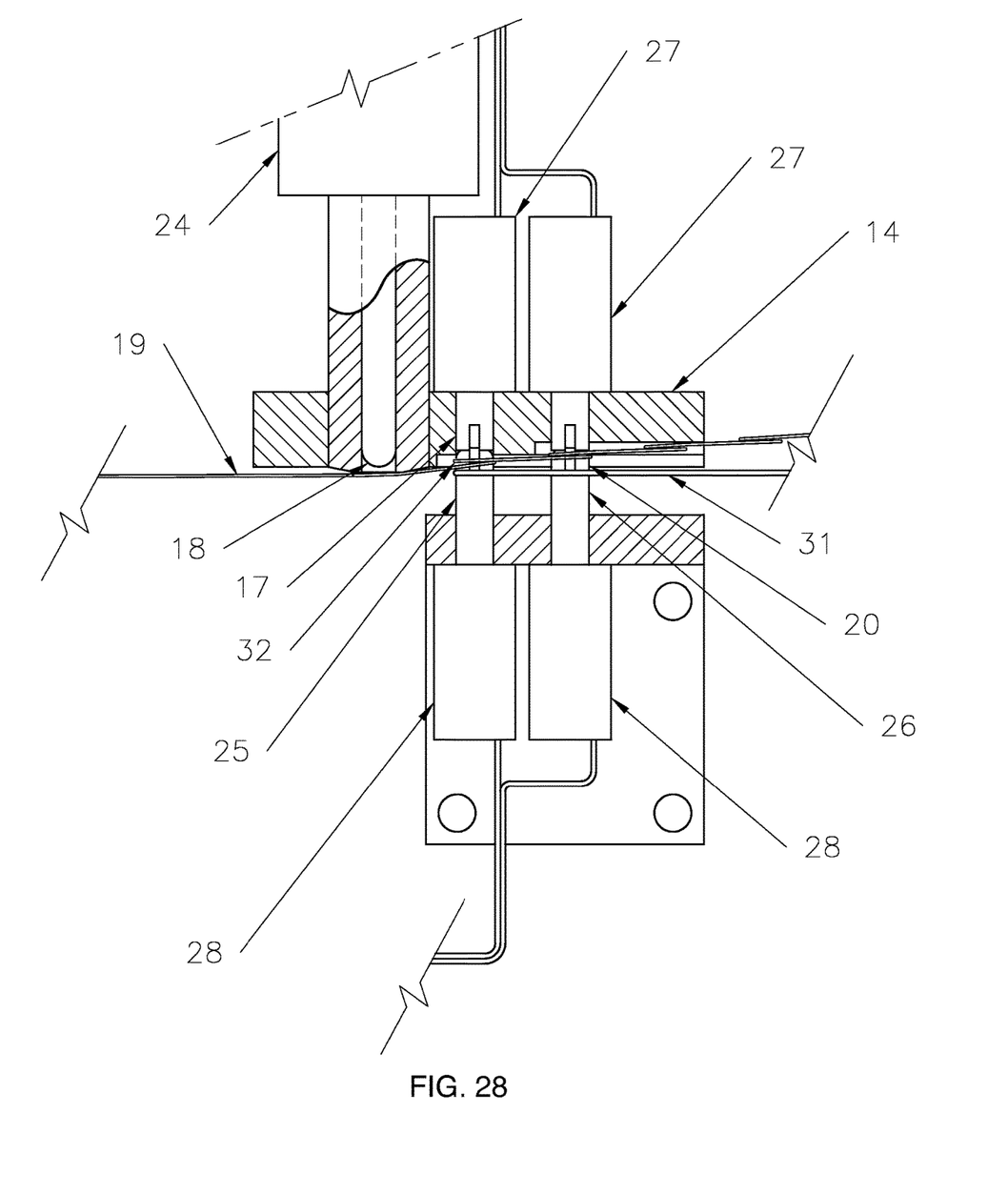
FIG. 28-32 show in plan view a sequence of operation of the apparatus of FIG. 24.
Figure 29:
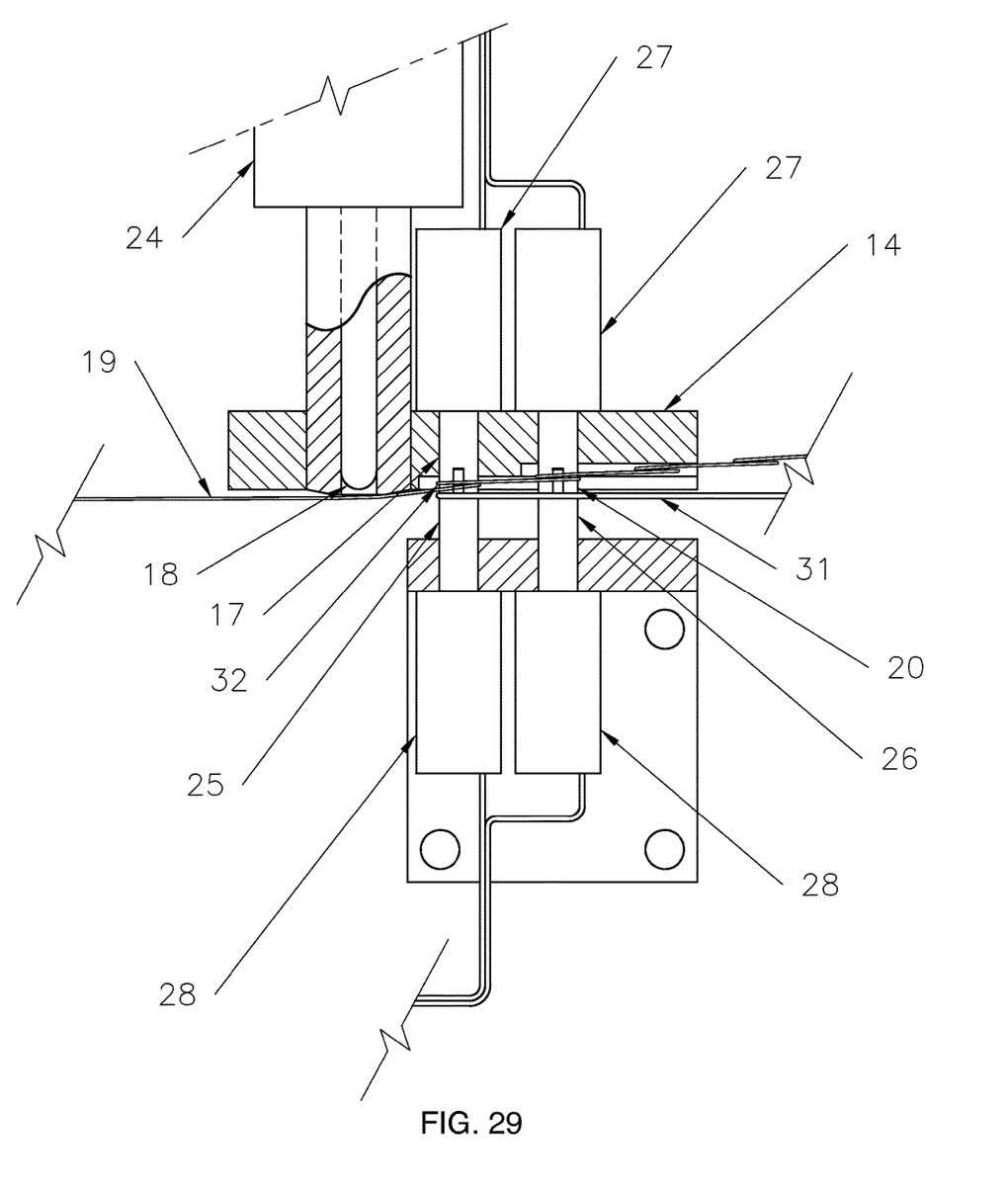
Figure 30:
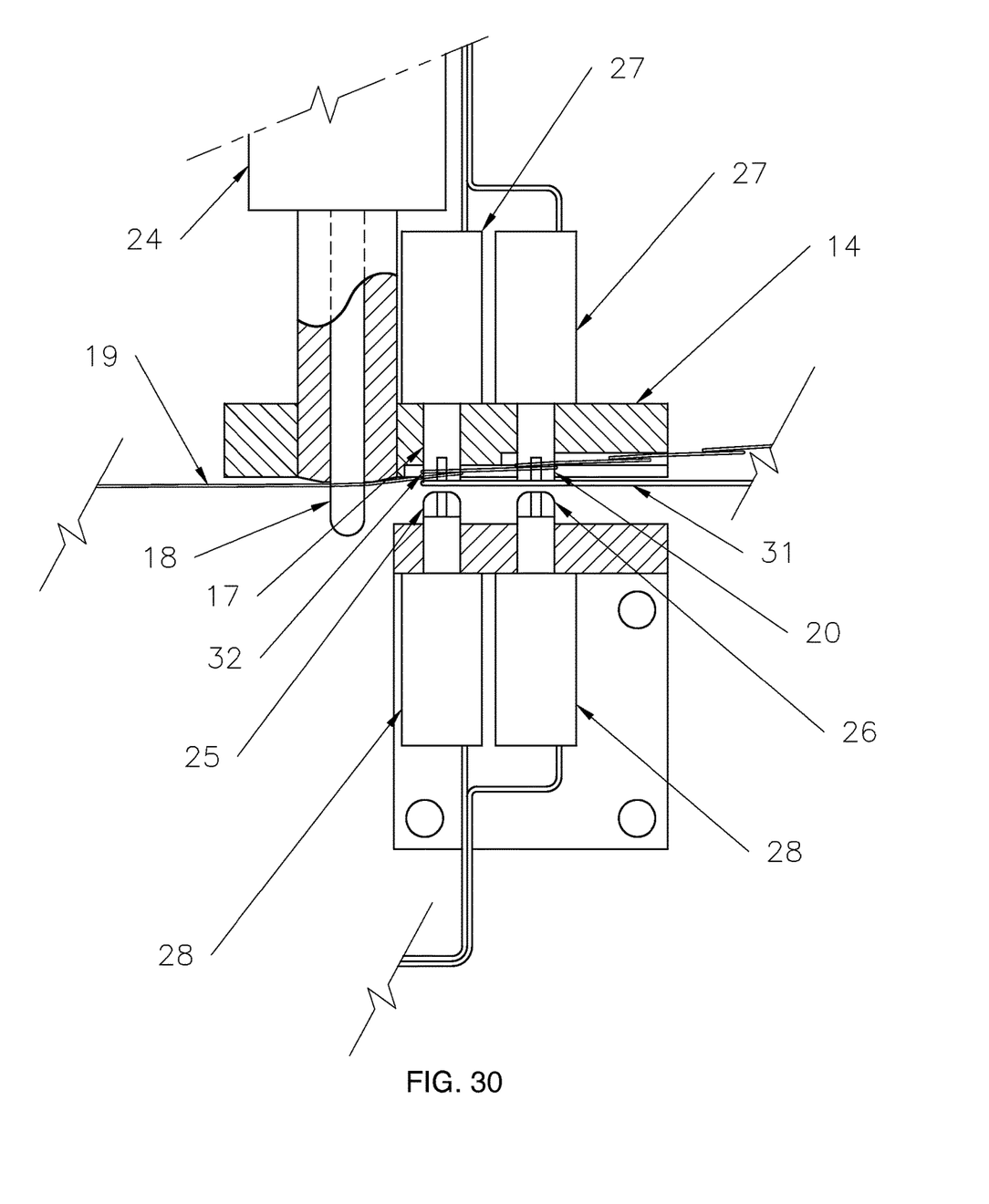
Figure 31:
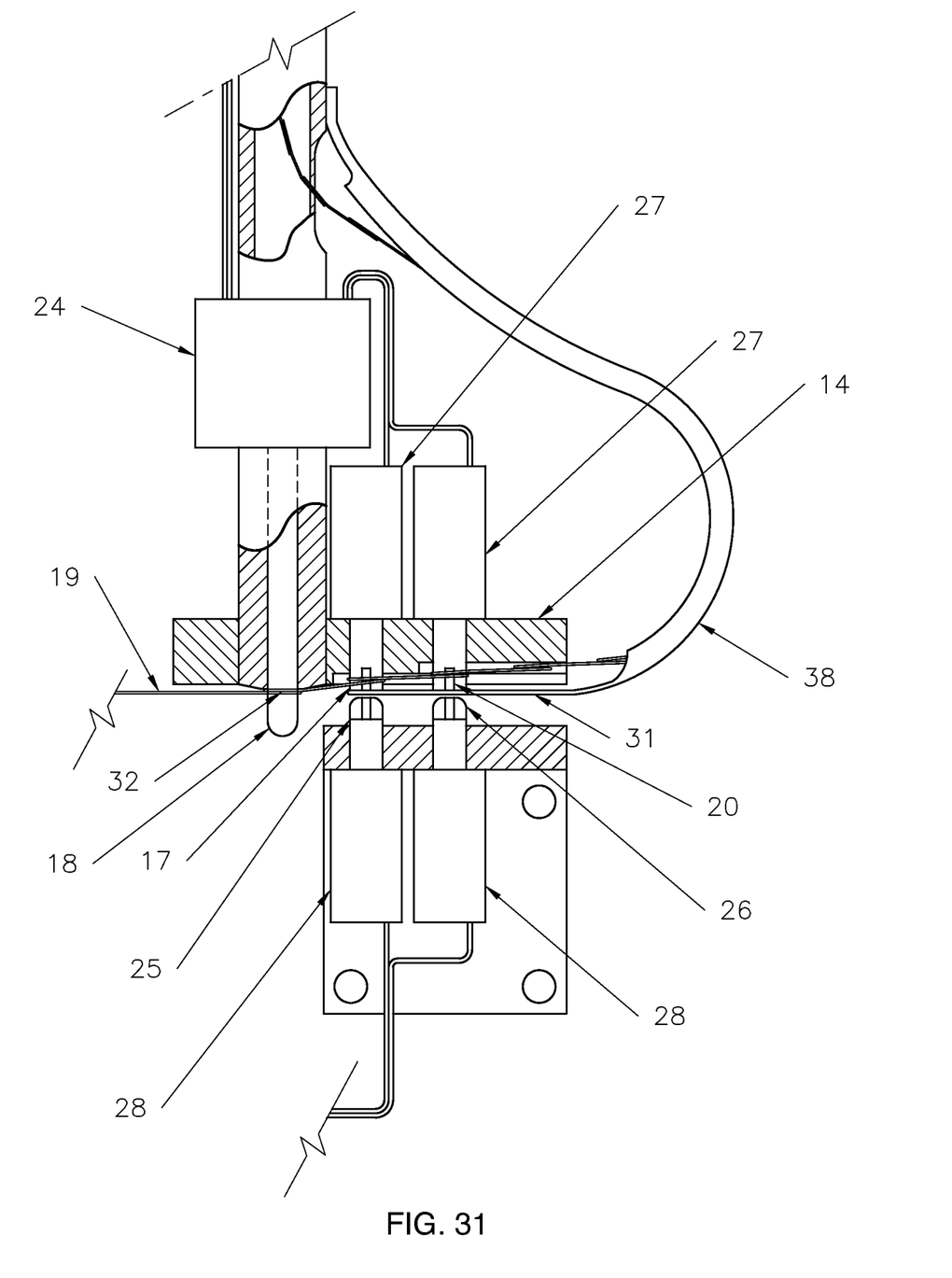
Figure 32:
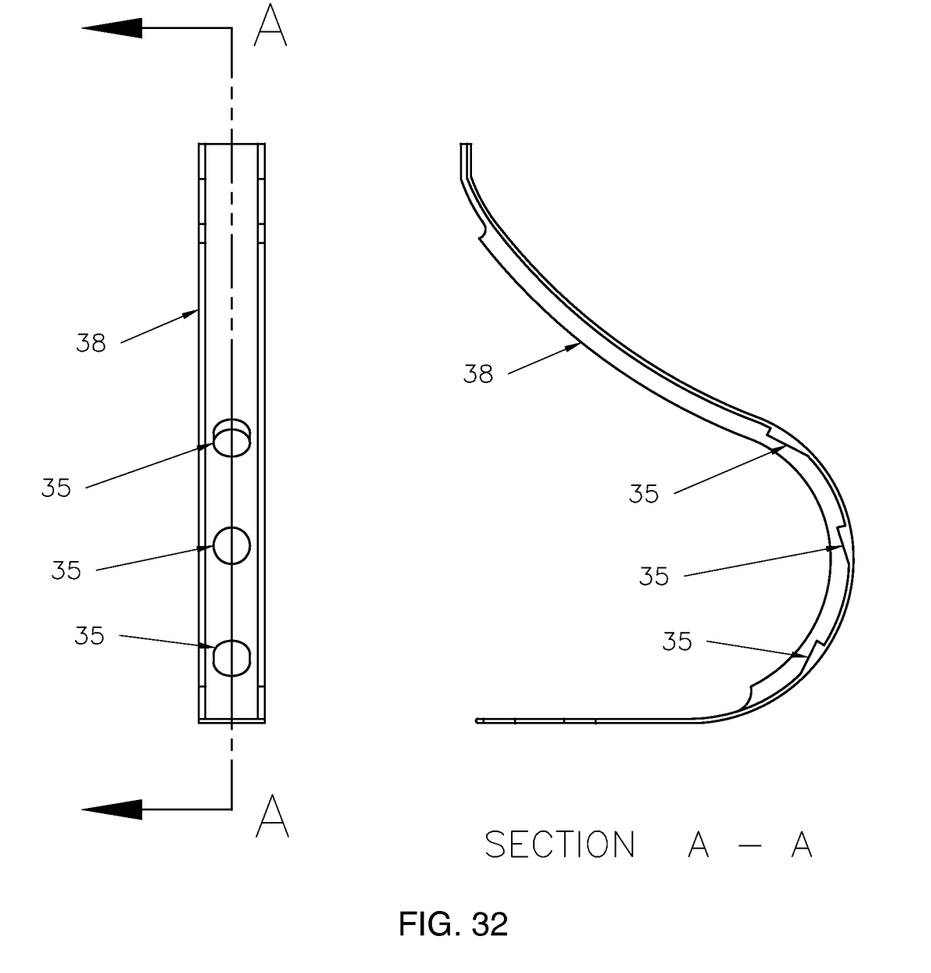

Referring to FIG. 28, the locators 25 and 26 are extended thru plate 31 and locator 25 engages the first loop 32. Referring to FIG. 29, the holding posts 17 and 20 extend and the holding post 17 nearest the mandrel 18 engages the loop 32 while it is supported by a locator 25. Referring to FIG. 30, the locators 25, 26 retract leaving the loop 32 held by the holding post 17. With the loop 32 restrained by a holding post 17, the mandrel 18 extends and the tensioner 13 moves away from the mandrel 18, removing all slack in the wire 19.

The cycle repeats, with another loop being wound and with the first loop being moved to a second holding post 20 and the loop just wound, being moved to the first holding post 17.

After a third loop is formed the first loop 32 is moved along a guide track 38 (FIGS. 31-32) behind the winding head 14 that directs the shaped wire into an elongated opening 34 in the side of the hollow main shaft 16. The inner surface of the guide track 38 has small ramp shaped steps or stops 35 (FIG. 32) that engage the loops to hold the strip of formed wire in place when the mandrel 18, holding posts 17 and 20, and locators 25 and 26 are retracted. The cycle repeats as many times as needed.

Thus, the winding head shaft 16 is rotated by a timing belt drive powered by a stepper motor (not shown). The mandrel 18, locators 25 and 26 and holding posts 17 and 20 are retracted or extended by solenoids. An arrangement of brushes 36 having a stationary mount and slip rings 37 mounted on the shaft 16 transfers electric power to the solenoids 24 and 27 mounted on the winding head 14 and shaft 16. A pneumatic cylinder 22 controlled by solenoid valves (not shown) moves the tensioning device 13 toward and away from the mandrel 18. A microprocessor is programmed to control the solenoids and the stepper motor. 4 As the continuous wire form is made, it slides along the guide channel 38 and into the hollow shaft. From the hollow shaft 16 the wire passes thru a tube 40 that rotates in sync with the main (hollow) shaft 16. The tube is long enough to allow any twisting of the straight wire and loops to be distributed along sufficient length of material to prevent excess distortion. As the completed material leaves the tube it is spooled by wrapping it over the face of the spool (not shown). The spool rotates as needed to compensate for any accumulation of twisting occurring from the loop winding process.

Although exemplary embodiments of the invention have been described with reference to attached drawings, those skilled in the art nevertheless will apprehend variations in form or detail that are consistent with the scope of the invention as defined by the appended claims.

What is claimed is:

1. An article for attaching a flexible panel to a frame, comprising:
    a ribbon of spring material, which is formed to provide a securement portion for securement along a perimeter of the flexible panel, and to provide a catch portion that extends contiguous from and in a same plane as the securement portion such that the ribbon of spring material comprises a series of at least two alternating portion pairs, each alternating portion pair respectively defining the securement portion and the catch portion;
    wherein the securement portion is formed as loops projecting from the catch portion and
    wherein the series of at least two alternating portion pairs lie in the same plane.

2. The article of claim 1 wherein the catch portion is formed as bends from the securement portion.

3. The article of claim 1, wherein the securement portion is formed as open loops from the catch portion.

4. The article of claim 1, wherein the securement portion is formed as twisted loops from the catch portion.

5. The article of claim 1 wherein the catch portion is formed as tabs from the securement portion.

6. The article of claim 1 further comprising a tape separate from the flexible panel to which the ribbon of spring material is fastened by the securement portion.

7. The article of claim 1 further comprising a release tab separate from the flexible panel and operatively connected at an end of the ribbon.

8. An article for attaching a flexible panel to a frame, comprising:
    a ribbon of spring material comprising a series of at least two alternating portion pairs, each alternating portion pair respectively defining a securement portion for securement along a perimeter of the flexible panel, and defining a catch portion that extends contiguous from and in a same plane as the securement portion;
    wherein the securement portion and the catch portion are formed of contiguous alternating bends of identical size and shape; and
    wherein the series of at least two alternating portion pairs lie in the same plane.

9. The article of claim 8, wherein the catch portion is formed as tabs from the securement portion.

10. The article of claim 8, further comprising a tape separate from the flexible panel to which the ribbon of spring material is fastened by the securement portion.

11. The article of claim 8, further comprising a release tab separate from the flexible panel and operatively connected at an end of the ribbon.

12. The article of claim 8, wherein the securement portion and the catch portion are of identical size and shape.

13. An article for attaching a flexible panel to a frame, comprising:
    a ribbon of spring material, which is formed to provide a securement portion for securement along a perimeter of the flexible panel, and to provide a catch portion that extends contiguous from and in a same plane as the securement portion, the ribbon of spring material comprising a series of at least two alternating portion pairs, each alternating portion pair respectively defining the securement portion and the catch portion;
    wherein the catch portion comprises generally straight sections of the ribbon of spring material extending between the loops comprising the securement portion; and
    wherein the series of at least two alternating portion pairs lie in the same plane.

14. The article of claim 13, wherein the securement portion is formed as open loops from the catch portion.

15. The article of claim 13, wherein the securement portion is formed as twisted loops from the catch portion.

16. The article of claim 13, further comprising a tape separate from the flexible panel to which the ribbon of spring material is fastened by the securement portion.

17. The article of claim 13, further comprising a release tab separate from the flexible panel and operatively connected at an end of the ribbon.

* * * * *